United States Patent
Miura et al.

(10) Patent No.: US 7,502,077 B2
(45) Date of Patent: Mar. 10, 2009

(54) DEVICE AND METHOD FOR PROCESSING VIDEO SIGNALS TO IMPROVE THE BLACK CONTRAST

(75) Inventors: Satoshi Miura, Kanagawa (JP); Takatomo Nagamine, Chiba (JP); Yumiko Mito, Kanagawa (JP); Jun Ueshima, Tokyo (JP)

(73) Assignee: Sony Corporation (JP)

( * ) Notice: Subject to any disclaimer, the term of this patent is extended or adjusted under 35 U.S.C. 154(b) by 893 days.

(21) Appl. No.: 10/517,583

(22) PCT Filed: Jun. 24, 2003

(86) PCT No.: PCT/JP03/07998

§ 371 (c)(1),
(2), (4) Date: Dec. 8, 2004

(87) PCT Pub. No.: WO04/002134

PCT Pub. Date: Dec. 31, 2003

(65) Prior Publication Data

US 2005/0157212 A1    Jul. 21, 2005

(30) Foreign Application Priority Data

Jun. 25, 2002    (JP)    ............................. 2002-185038

(51) Int. Cl.
*H04N 5/14* (2006.01)
*H04N 5/16* (2006.01)
*H04N 5/57* (2006.01)
*H04N 5/68* (2006.01)
*H04N 9/77* (2006.01)

(52) U.S. Cl. ........................ 348/691; 348/379; 348/673; 348/687; 348/712

(58) Field of Classification Search ................. 348/379, 348/673, 687, 691
See application file for complete search history.

(56) References Cited

U.S. PATENT DOCUMENTS 5,212,545 A * 5/1993 Kageyama ................... 348/655

(Continued)

FOREIGN PATENT DOCUMENTS

JP    4-265075    9/1992

(Continued)

*Primary Examiner*—Brian P Yenke
(74) *Attorney, Agent, or Firm*—Lerner, David, Littenberg, Krumholz & Mentlik, LLP

(57) ABSTRACT

A video signal-processing device that can improve the apparent contrast of the luminance signal at a television receiving set includes a quantity of black expansion computing section for computationally determining the quantity of black expansion when the luminance component of the input video signal is not higher than a first luminance level, a gain controller for regulating the quantity of black expansion as computationally determined by the quantity of black expansion computing section, a quantity of black expansion adding section for generating an output video signal by adding the quantity of black expansion regulated by the gain controller to the luminance component of the input video signal, and a vertical span adding block for integrating the luminance component of the output video signal not higher than a second luminance level for a field. The gain controller regulates the quantity of black expansion according to the luminance component integrated by the vertical span adding block to improve the apparent contrast of the luminance signal at the television receiving set by accurately expanding black.

20 Claims, 12 Drawing Sheets

U.S. PATENT DOCUMENTS

| | | | |
|---|---|---|---|
| 5,255,080 A * | 10/1993 | Kageyama et al. | 348/675 |
| 5,416,533 A * | 5/1995 | Kageyama | 348/673 |
| 5,808,697 A * | 9/1998 | Fujimura et al. | 348/672 |
| 6,111,607 A * | 8/2000 | Kameyama | 348/256 |
| 7,034,895 B2 * | 4/2006 | Okunuki et al. | 348/673 |
| 7,113,227 B1 * | 9/2006 | Kakuya et al. | 348/678 |
| 7,312,834 B2 * | 12/2007 | Sakaguchi | 348/687 |
| 2002/0047934 A1 * | 4/2002 | Nitta et al. | 348/689 |
| 2003/0189558 A1 * | 10/2003 | Aoki et al. | 345/204 |

FOREIGN PATENT DOCUMENTS

| | | |
|---|---|---|
| JP | 5-30386 | 2/1993 |
| JP | 6-189158 | 7/1994 |
| JP | 7-154646 | 6/1995 |
| JP | 07007635 | 11/1995 |
| JP | 9-65173 | 3/1997 |
| JP | 11069260 | 3/1999 |
| JP | 2000-244769 | 9/2000 |

* cited by examiner

DEVICE AND METHOD FOR PROCESSING VIDEO SIGNALS TO IMPROVE THE BLACK CONTRAST

TECHNICAL FIELD

This invention relates to a device and a method for processing video signals to be used for the purpose of improving the black contrast in a television receiving set or the like.

The present application claims priority from Japanese Patent Application No. 2002-185038 filed on Jun. 25, 2002, content of which is hereby incorporated by reference into this application.

BACKGROUND ART

The signal level of black color of video signals transmitted to television receiving sets for the purpose of displaying images on the display screen of the television set can vary depending on the broadcasting station, the TV camera, the type of the home use VTR or the like. It is known that the apparent black contrast is improved by expanding (the amplitudes of) signals for black in the television receiving set that reproduces video signals. FIG. 1 of the accompanying drawings is a block diagram of a video signal-processing device 7 proposed in Japanese Patent Application Laid-Open Publication No. 7-154644, which is a typical black level expansion circuit.

The video signal-processing device 7 illustrated in FIG. 1 comprises an input terminal 71, a black expanding section 72, an output terminal 73, a black peak holding section 74, a comparator 75, a pedestal level transmitting section 76 and a gain control amplifier 77. The video signal-processing device 7 operates for feed back control in order to make the peak position of the input black level (to be referred to as black peak level hereinafter) agree with the pedestal level.

The black expanding section 72 performs an operation of black expansion on black level signals lower than a predetermined threshold level TH as shown in FIG. 2A out of the video signals input by way of the input terminal 71 depending on the feedback gain input from the comparator 75. The black expanding section 72 then transmits the black level signals that have been subjected to an operation of black expansion to the output terminal 73 and the black peak holding section 74. The video signals transmitted to the output terminal 73 are output to the television receiving set without modification.

The black peak holding section 74 sequentially takes out only the video signals that do not contain any synchronizing signal component out of the transmitted black level signals and detects the black peak level BL of each of the signals. The black peak holding section 74 applies the detected black peak level to the comparator 75. The configuration of the black peak holding section 74 will be described in greater detail hereinafter.

The comparator 75 receives the black peak level from the black peak holding section 74 and the pedestal level Ep as shown in FIG. 2B from the pedestal level transmitting section 76. Then, the comparator 75 determines the difference between the black peak level and the pedestal level Ep and outputs the difference to the gain control amplifier 77.

The gain control amplifier 77 generates a feedback gain on the basis of the black peak level and the pedestal level Ep input to it and transmits the feedback gain to the black expanding section 72. Note that the gain control amplifier 77 generates a feedback gain so as to reduce the difference between the black peak level and the pedestal level input to it.

Upon receiving the feedback gain, the black expanding section 72 can perform an operation of black expansion so as to make the black peak level agree with the pedestal level Ep.

As the black expanding section 72 repeats the operation of transmitting a video signal that has been subjected to an operation of black expansion to the black peak holding section 74 for the black level signals, it is possible to make the black peak level gradually come close to the pedestal level Ep. Thus, the video signal-processing device 7 can converge only the video signals with a black level lower than the predetermined threshold level TH as shown in FIG. 2B to a constant luminance level and can hold the video signals other than black level signals without manipulating the amplitude so that it is possible to improve the black contrast, while maintaining the brightness of the entire image to a constant level.

Now, the black peak holding section 74 of the video signal-processing device 7 will be described in greater detail. FIG. 3 is a schematic circuit diagram of the black peak holding section 74. The black peak holding section 74 comprises an input section 81 for receiving video signals that have been subjected to an operation of black expansion from the black expanding section 72, a first transistor 82, a second transistor 83, a third transistor 84, a first power source 86, a second power source 87, a resistor 88, a black area control resistor 89, a capacitor 90, an output section 91 for applying the detected black peak level to the comparator 75, a first current source 92 and a second current source 93.

The first transistor 82 receives the video signal Be that is expanded for black from the input section 81 by way of its base terminal. Its emitter terminal is connected to the first current source 92, while its collector terminal is connected to the base terminal of the resistor 88 and the base terminal of the third transistor 84. The second transistor 83 has its base terminal connected to the second current source 93, the capacitor 90, the output section 91 and so on and is adapted to transmit the held black peak level to the comparator 75 by way of the output section 91. The third transistor 84 has its base terminal connected to the collector terminal of the first transistor 82 and the resistor 88 and its collector terminal is connected to the black area control resistor 89. Note that each of the first transistor 82, the second transistor 83 and the third transistor 84 is operated to become ON/OFF according to the potential difference between the base and the emitter thereof.

The resistor 88 has one of its ends connected to the collector terminal of the first transistor 82 and the base terminal of the third transistor 84 in order to regulate the voltage applied from the first transistor 82 to the third transistor 84. The black area control resistor 89 has one of its ends connected to the base terminal of the second transistor 83 and its other end connected to the collector terminal of the third transistor 84 in order to limit the electric current supplied from the second current source 93 and the capacitor 90 to the third transistor 84. The capacitor 90 typically stores an electric charge that corresponds to the current value of the black peak and is connected to the connection point of the above-described second transistor 83 and the black area control resistor 89 as well as to the output section 91 and the second current source 93.

Now, the operation of the black peak holding section 74 will be described below.

The first transistor 82 and the second transistor 83 form an operational amplifier for switching operations. The first transistor 82 becomes ON and the second transistor 83 becomes OFF when the base potential of the first transistor 82 is lower than the base potential of the second transistor 83, whereas the first transistor 82 becomes OFF and the second transistor 83 becomes ON when the base potential of the first transistor 82 is higher than the base potential of the second transistor 83.

When a video signal showing a black peak level lower than the currently held black peak level is input to the black peak holding section 74 having such an operational amplifier by way of the input section 81, the base potential of the first transistor 82 is lowered to make the first transistor 82 become ON. As a result, an electric current flows from the collector terminal of the first transistor 82 to the resistor 88 to raise the potential difference between the opposite ends of the resistor 88.

As the potential difference between the opposite ends of the resistor 88 rises to such an extent as to turn on the third transistor 84, the transistor 84 becomes ON and an electric current flows from the second current source 93 and the capacitor 90 to the third transistor by way of the collector terminal thereof. As a result, the base potential of the second transistor 83 is lowered. In other words, when a video signal whose black peak level is lower than the black peak level that is currently held by the black peak holding section 74 is input, the black peak holding section 74 lowers the black peak level it holds to the lower black peak level.

When, on the other hand, a video signal showing a black peak level higher than the currently held black peak level is input to the black peak holding section 74 by way of the input section 81, the base potential of the first transistor 82 is raised to make the second transistor 83 become ON. As a result, the first transistor 82 becomes OFF and hence the third transistor 84 also becomes OFF so that the electric current output from the second current source 93 is stored in the capacitor 90.

Thus, as the above sequence of operation is repeated, the lowest level of the input video signal, or the black peak level, is held to the base terminal of the second transistor 83.

FIG. 4 illustrates the relationship between the input video signal E and the black peak level BL held by the black peak holding section 74. In FIG. 4, dotted line Bp1 indicates the black peak level when the black area control resistor 89 is ignored. If point $a_{11}$ in FIG. 4 shows the voltage currently held for the black peak and an input signal having a lower value is entered, the black peak holding level falls to point $a_{12}$ and a new black peak is held. If the voltage of the input signal rises from there, the third transistor 84 in FIG. 3 becomes OFF and the electric current from the second current source 93 is stored in the capacitor 90. Since the current value from the second current source 93 is typically very small, the voltage of the output gradually rises. In this way, the black peak holding operation proceeds.

In FIG. 4, dotted line Bp2 indicates the black peak level when the black area control resistor 89 is made to show a large resistance. Since the electric current supplied to the third transistor 84 is limited by the black area control resistor 89, the capability of tracking the black peak holding level in response to the input signal falls so that the black peak holding level rises if compared with the dotted line Bp1.

In other words, the black peak level that is held changes as a function of the resistance of the black area control resistor 89. For the black peak level indicated by the dotted line Bp2 falls to the black peak level indicated by the dotted line Bp1, the black area of the input signal needs to be greater. Differently stated, it is possible for the black peak holding section 74 of the video signal-processing device 7 to determine the area of a black region for which an operation of black expansion is conducted by means of the black area control resistor 89 by selecting the resistance of the black area control resistor 89.

With the above described known video signal-processing device 7, the black peak level held by the black peak holding section 74 theoretically undulates as shown by the dotted lines Bp1 and Bp2 in FIG. 4 so that, if black is expanded according to the black peak holding level, the image being displayed may show mainly vertical shading depending on the video signal, which is visually not pleasant to the viewers.

While the undulations of the black peak holding level can be reduced by increasing the capacitance of the capacitor 90 and/or reducing the electric current supplied from the second current source 93, there arises a problem that the known video signal-processing device 7 cannot respond sufficiently quickly when a video signal for a quickly changing scene is input.

Furthermore, when an analog system is used and the component blocks of the black peak holding section 74 shown in FIG. 3 are realized by using ICs, there arises a problem that the current values of the black area control resistor 89, the capacitor 90 and the first and second current sources 92, 93 can disperse to make it difficult for the video signal-processing device 7 to operate stably.

DISCLOSURE OF THE INVENTION

It is therefore an object of the present invention to provide a novel device and a novel method for processing video signals that can dissolve the above identified problems of known video signal-processing devices.

Another object of the present invention is to provide a device and a method for processing video signals that can improve the resolution of television receiving sets by accurately expanding black.

The above objects and other objects of the invention are achieved providing a device and a method for processing video signals that are adapted to accurately expand black when the luminance component of the input video signal is not higher than a first luminance level by regulating the computationally determined extent of black expansion on the basis of the luminance component of the output video signal that is not higher than a second luminance level integrated for one field in order to improve the apparent contrast of the luminance signal at the television receiving set.

A video signal-processing device according to the invention comprises a quantity of black expansion computing section for computationally determining the quantity of black expansion when the luminance component of the input video signal is not higher than a first luminance level, a regulating means for regulating the quantity of black expansion computationally determined by the quantity of black expansion computing section, an output video signal generating means for generating an output video signal by adding the quantity of black expansion regulated by the regulating means to the luminance component of the input video signal and a first field integrating means for integrating the luminance component of the output video signal not higher than a second luminance level for a field. The regulating means of the processing device regulates the quantity of black expansion according to the luminance component integrated by the first field integrating means.

A video signal-processing method according to the invention comprises computationally determining the quantity of black expansion when the luminance component of the input video signal is not higher than a first luminance level, regulating the computationally determined quantity of black expansion, generating an output video signal by adding the regulated quantity of black expansion to the luminance component of the input video signal, integrating the luminance component of the output video signal not higher than a second luminance level for a field and further regulating the quantity of black expansion according to the integrated luminance component.

Still other objects and specific advantages of the present invention will become apparent from the following description of preferred embodiments given below by referring to the accompanying drawings.

BEST MODE FOR CARRYING OUT THE INVENTION

Now, a device and a method for processing video signals according to the present invention will be described in detail by referring to the accompanying drawings.

Figure 1:
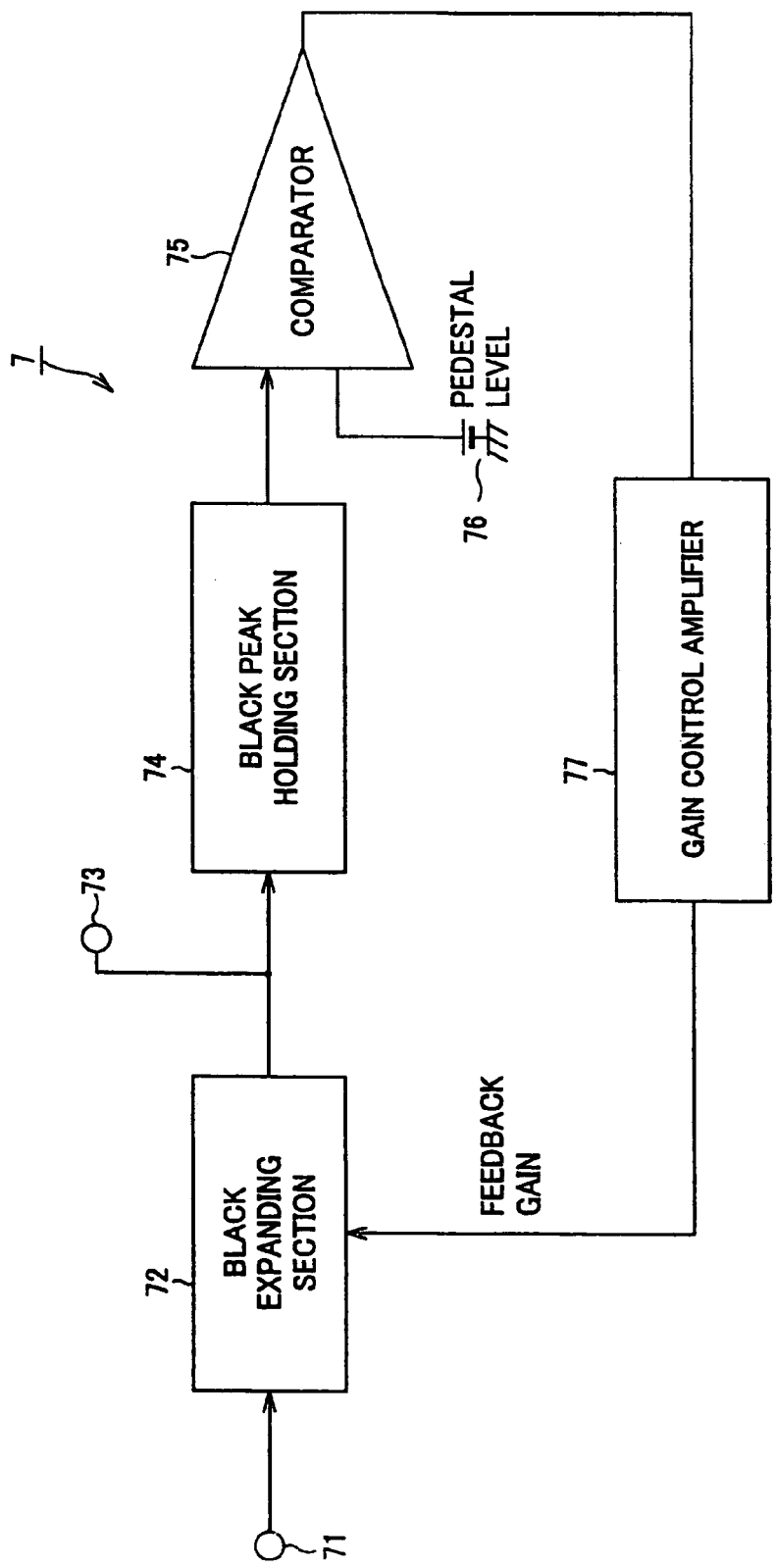
FIG. 1 is a schematic block circuit diagram of a known video signal-processing device.
Figure 2:
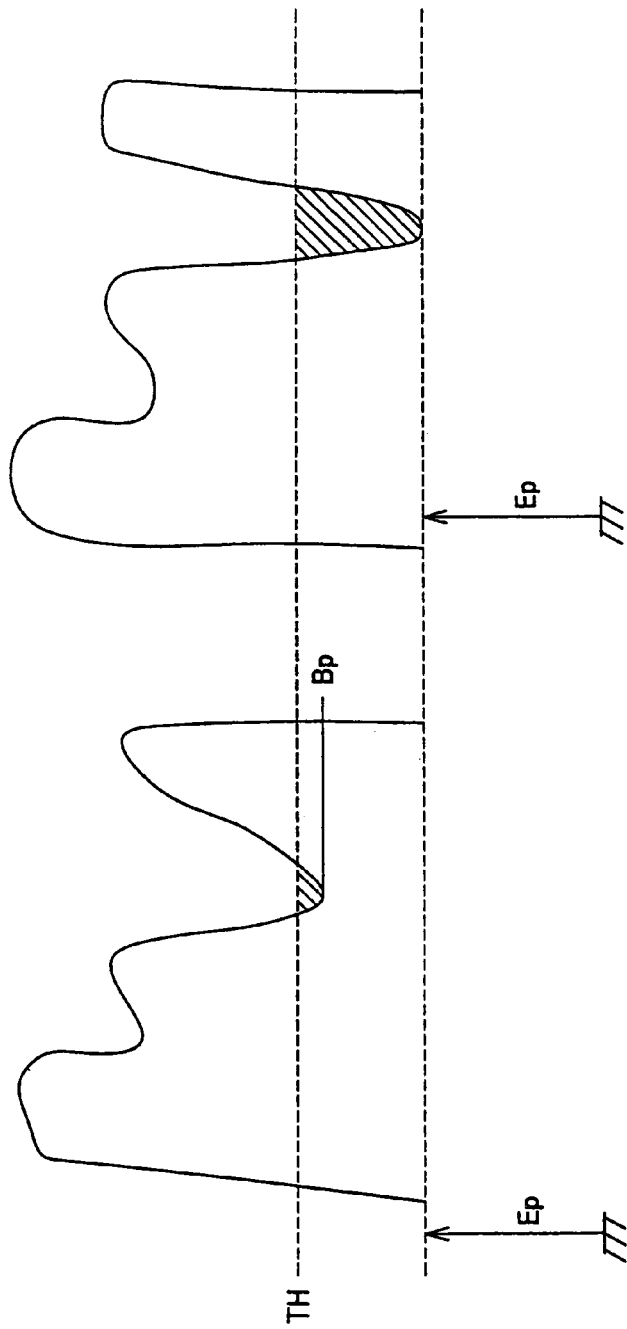
FIGS. 2A and 2B are graphs illustrating black expansion of a known video signal-processing device.
Figure 3:
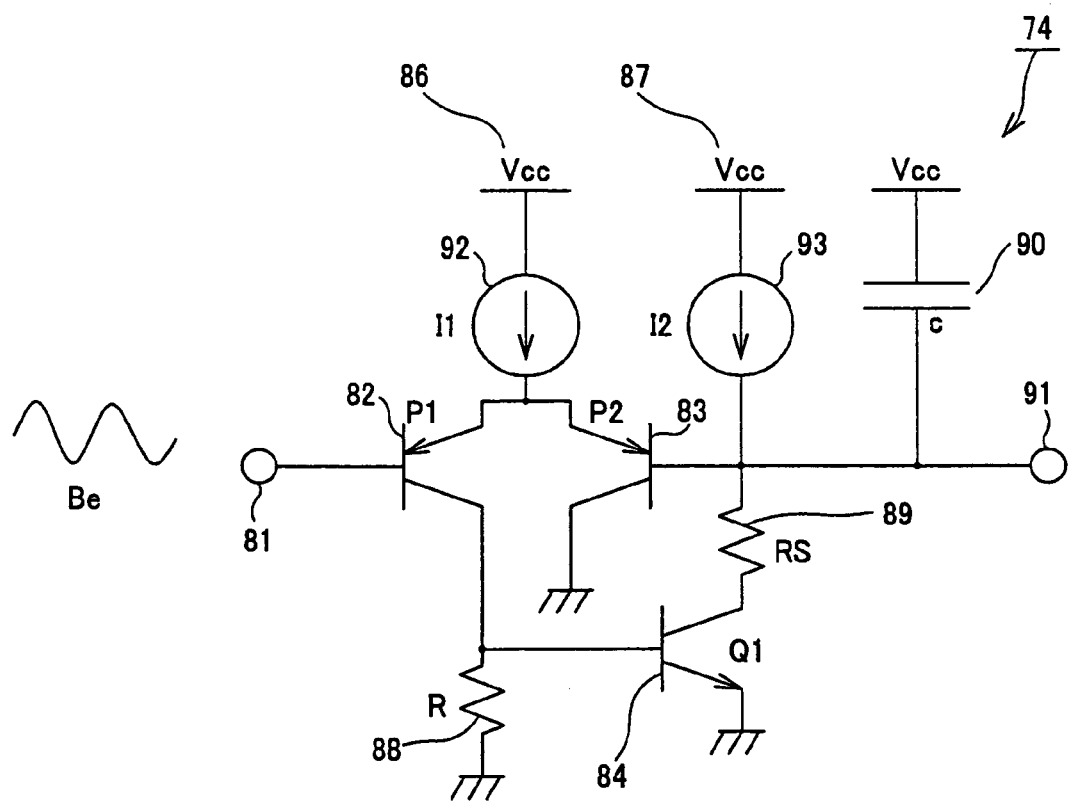
FIG. 3 is a schematic circuit diagram of the black peak holding section of a known video signal-processing device.
Figure 4:
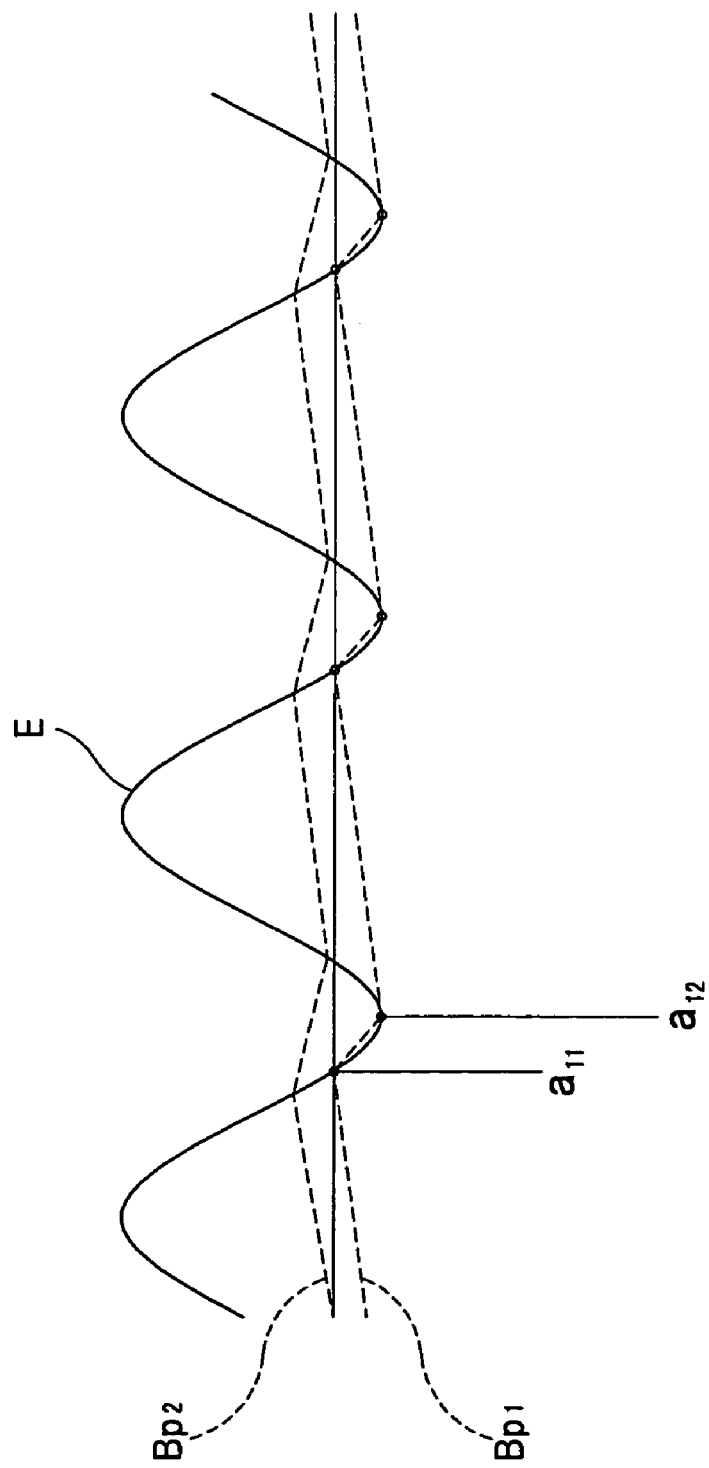
FIG. 4 is a graph illustrating the relationship between an input video signal and the black peak level held by the black peak holding section.
Figure 5:
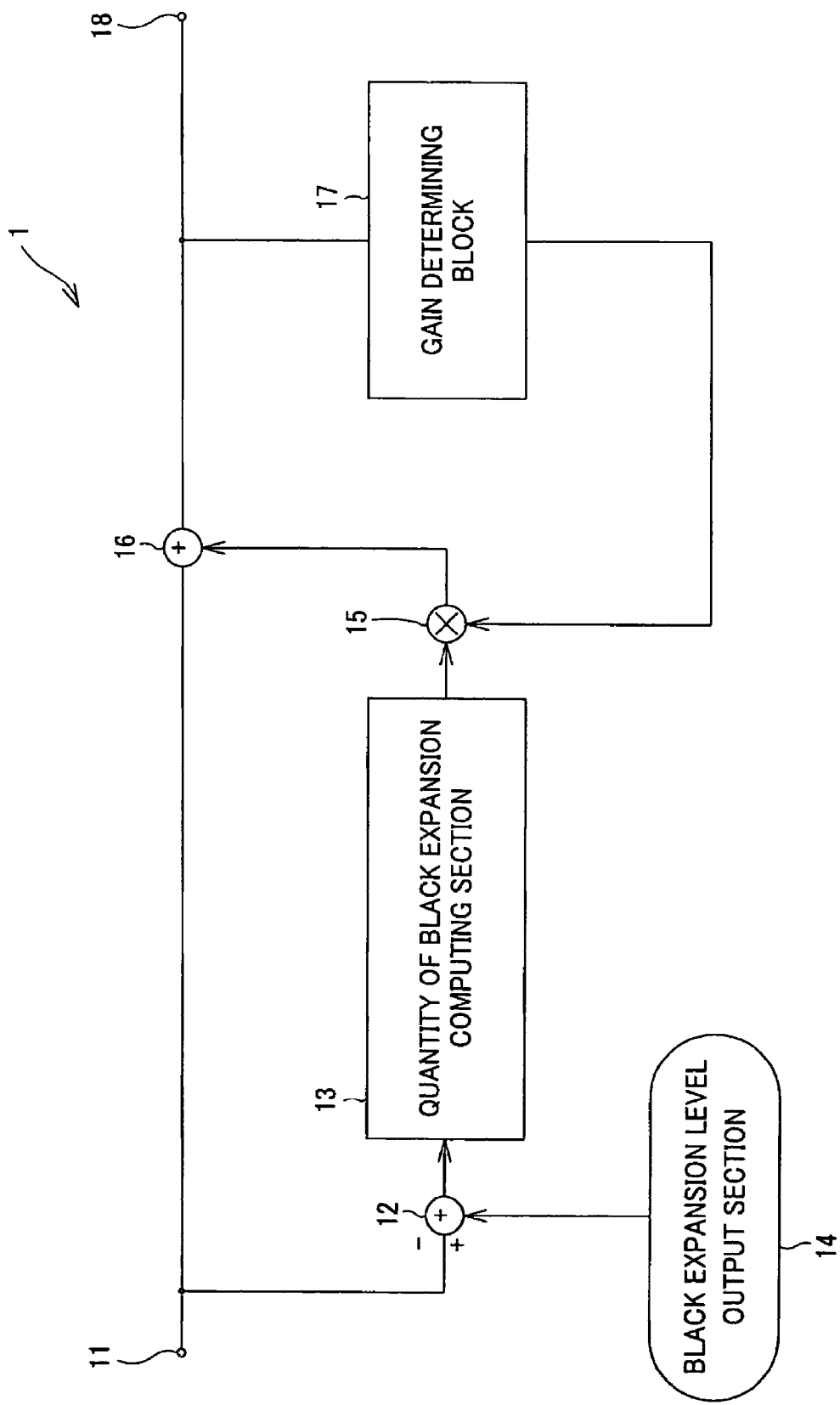
FIG. 5 is a schematic block circuit diagram of video signal-processing device according to the invention.

As shown in FIG. 5, a video signal-processing device 1 according to the invention comprises an input terminal 11 for receiving input video signals from broadcasting stations, a difference computing section 12, a quantity of black expansion computing section 13, a black expansion level output section 14, a gain controller 15, a quantity of black expansion adding section 16, a gain determining block 17 and an output terminal 18 for outputting the output video signal to a television receiving set. The video signal-processing device 1 distinguishes the luminance signal of the input video signal depending on the contents of the signal and, if necessary, expands black to the pedestal level, which is the reference level for black, for the purpose of convergence.

The difference computing section 12 receives the input video signal transmitted from the input terminal 11 and also the black expansion level for starting an operation of black expansion transmitted from the black expansion level output section 14. The difference computing section 12 obtains the difference between the luminance component of the input video signal and black expansion level, and outputs it to the quantity of black expansion computing section 13.

The quantity of black expansion computing section 13 receives the difference between the luminance component of the input video signal and the black expansion level. The quantity of black expansion computing section 13 computes the quantity of black expansion depending on the difference and outputs it to the gain controller 15.

The gain controller 15 regulates the quantity of black expansion input from the quantity of black expansion computing section 13 on the basis of the feedback gain supplied from the gain determining block 17. The gain controller 15 realizes the above described operation of regulating the quantity of black expansion by multiplying the quantity of black expansion typically by the supplied feedback gain. The gain controller 15 may perform the above described operation of regulating the quantity of black expansion on a field by field basis. The gain controller 15 transmits the regulated quantity of black expansion to the quantity of black expansion adding section 16.

The quantity of black expansion adding section 16 receives the input video signal transmitted from the input terminal 11 and the quantity of black expansion from the gain controller 15. Then, the quantity of black expansion adding section 16 generates an output video signal by adding the quantity of black expansion to the luminance component of the input video signal and transmits it to the gain determining block 17 and the output terminal 18. Note that the luminance component of the output video signal is expanded to the black side because the quantity of black expansion with a negative polarity is added to the luminance component of the input video signal with a positive polarity.

The gain determining block 17 distinguishes the luminance signal component of the output video signal supplied from the quantity of black expansion adding section 16, computationally determines the feedback gain of black expansion and supplies it to the gain controller 15.

The feedback gain generated by the gain determining block 17 may be defined to be not smaller than 0 and not greater than 1. The quantity of black expansion can be transmitted to the quantity of black expansion adding section 16 without modification if 1 is selected for the feedback gain, whereas the operation of black expansion can be suspended if 0 is selected for the feedback gain. The gain determining block 17 will be described in greater detail hereinafter.

The output terminal 18 outputs the output video signal supplied from the quantity of black expansion adding section 16 to the television receiving set (not shown).

Now, a typical operation of the video signal-processing device 1 will be described below.

Figure 6:
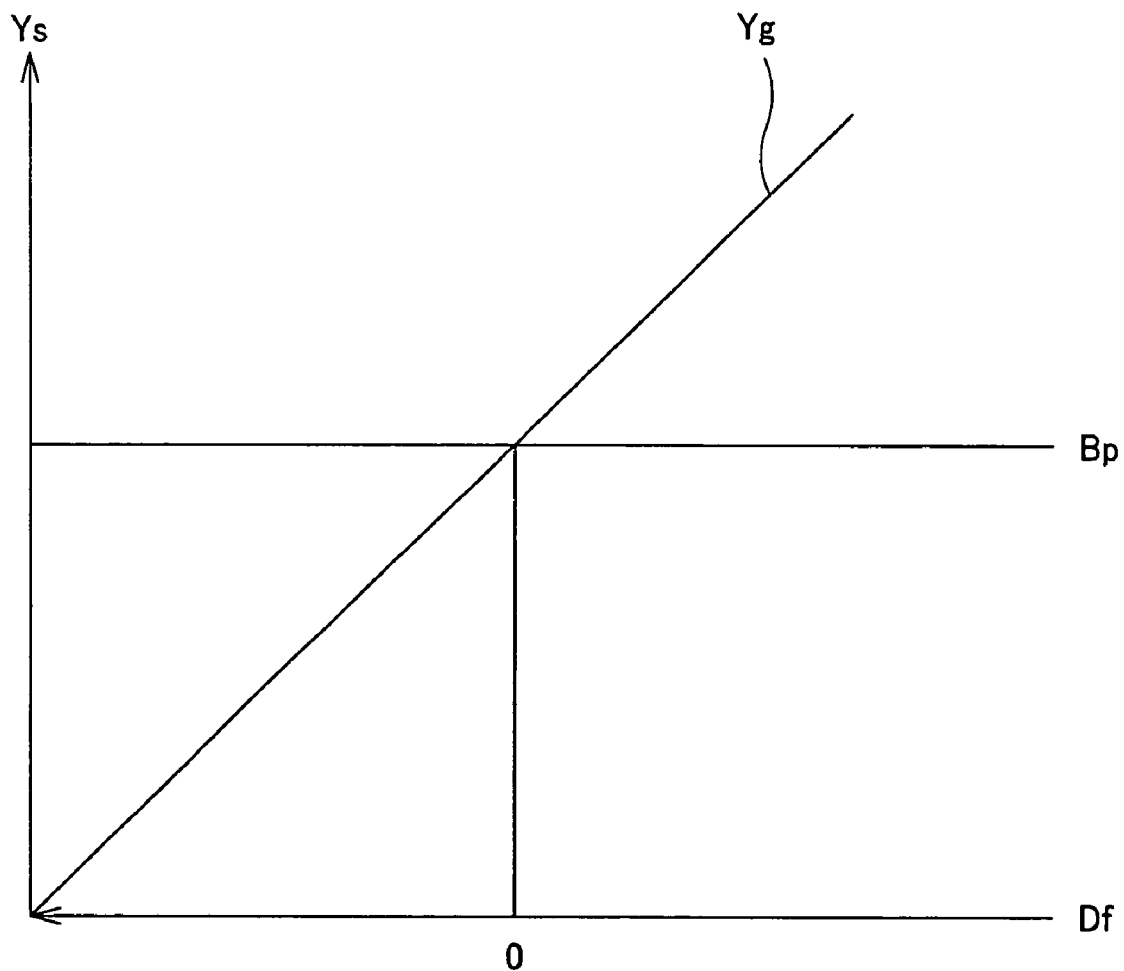
FIG. 6 is a graph schematically illustrating the difference by the difference computing section.

The difference computing section 12 determines the difference between the luminance component of the input video signal transmitted from the input terminal 11 and the black expansion level. If the luminance component Yc of the input video signal indicated by the solid oblique line in FIG. 6 is equal to the black expansion level Bp, the difference Df indicated by the horizontal axis is equal to 0. The difference Df indicated by the horizontal axis increases as the luminance component Ys of the input video signal downwardly leaves the black expansion level Bp. If the luminance component Ys of the input video signal is greater than the black expansion level Bp, the luminance of the video signal is prevented from falling at the white side by selecting 0 for the difference.

Figure 7:
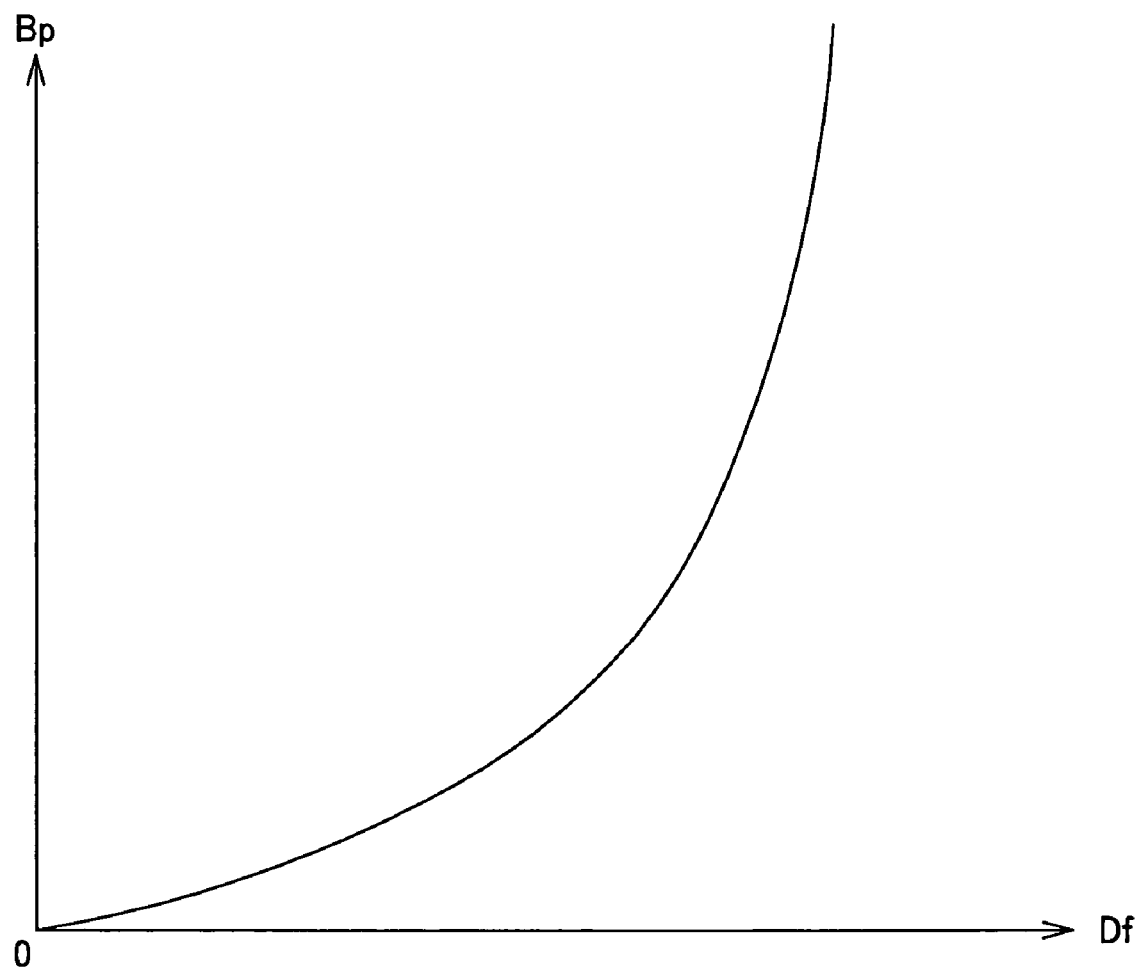
FIG. 7 is a graph schematically illustrating the quantity of black expansion computed by the quantity of black expansion computing section.

The quantity of black expansion computing section 13 may so compute the quantity of black expansion as to bring the difference to square as shown in FIG. 7 in order to increase the quantity of black expansion Bp remarkably as the computed difference Df increases. Then, the quantity of black expansion computing section 13 transmits the computed quantity of black expansion to the gain controller 15.

The gain controller 15 regulates the quantity of black expansion by multiplying the quantity of black expansion computed in a manner as described above by the feedback gain transmitted from the gain determining block 17 and transmits the regulated quantity of black expansion to the quantity of black expansion adding section 16.

Figure 8A:
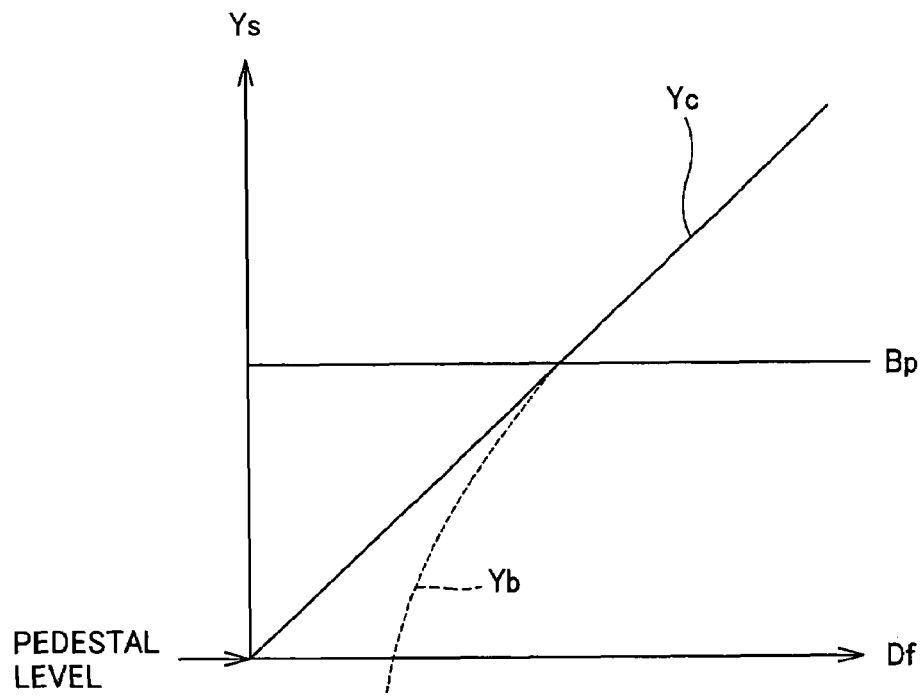
FIGS. 8A and 8B are graphs schematically illustrating the luminance component of the output video signal generated by adding the quantity of black expansion to the luminance component of the input video signal by the quantity of black expansion computing section.
Figure 8B:
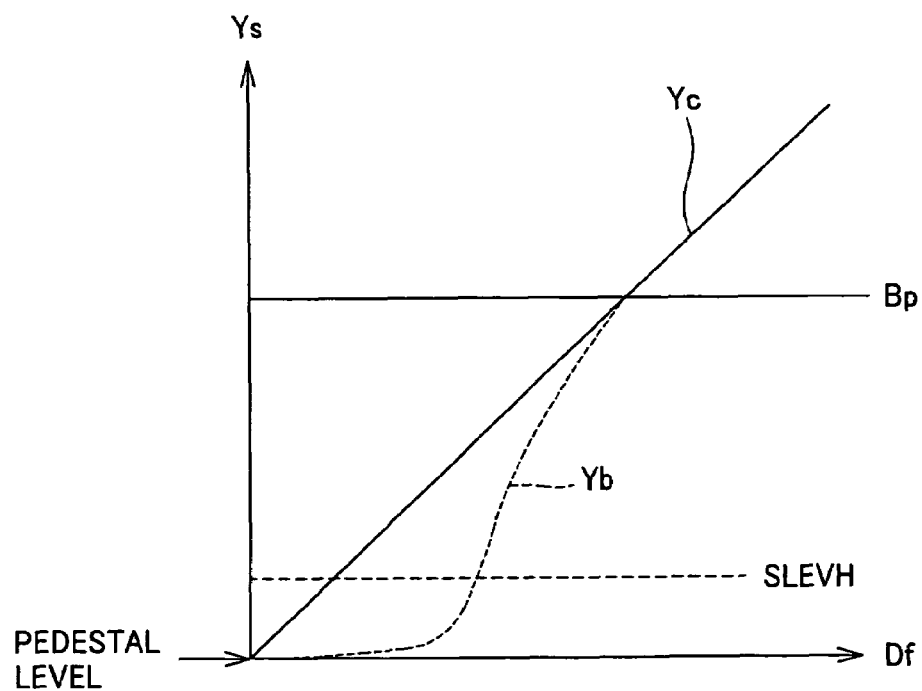

The quantity of black expansion adding section 16 generates an output video signal on the basis of the quantity of black expansion regulated by the gain controller 15. FIGS. 8A and 8B are graphs showing the luminance component Yb of the output video signal generated by adding the above described quantity of black expansion with a negative polarity to the luminance component Yc of the input video signal. As shown in FIGS. 8A and 8B, the quantity of black expansion is made equal to 0 when the luminance component Yc of the input video signal is not smaller than the black expansion level Bp so that the luminance component Yb of the output video signal agrees with the luminance component Yc of the input video signal. On the other hand, the quantity of black expansion increases as the luminance component Yc of the input video signal falls below the black expansion level Bp so that consequently the luminance component Yb of the output video signal is reduced.

The feedback gain supplied from the gain determining block 17 is added to the quantity of black expansion as described above. FIG. 8A shows an instance where the quantity of black expansion is multiplied by the feedback gain that is equal to 1. The quantity of black expansion increases and the luminance component Yb of the output video signal exceeds the pedestal level as the luminance component Yc of the input video signal falls far below the black expansion level Bp. Therefore, when the luminance component Yb of the output video signal falls below the pedestal level, the quantity of black expansion is suppressed to converge the luminance component Yb of the output video signal to the pedestal level by making the feedback gain smaller than 1 as shown in FIG. 8B.

The video signal-processing device 1 of this embodiment extracts the input video signal by way of the difference computing section 12 and the black expansion level output section 14 as the input video signal is sequentially supplied by way of the input terminal 11, and computes the quantity of black expansion only when the video signal is determined as a signal showing a level that needs to be expanded. The video signal-processing device 1 generates the output video signal to be supplied to the television receiving set by feeding back the computed quantity of black expansion by way of the gain determining block 17 in a controlled manner and sequentially adding it to the input video signal. With this arrangement, the video signal that is recognized as signal showing a black level that needs to be expanded is subjected to black expansion and the feedback gain is made smaller than 1 to suppress the quantity of black expansion and converge the luminance component of the output video signal to the pedestal level when the level falls below the pedestal level as a result of expansion. Thus, it is possible to improve the apparent contrast.

Figure 9:
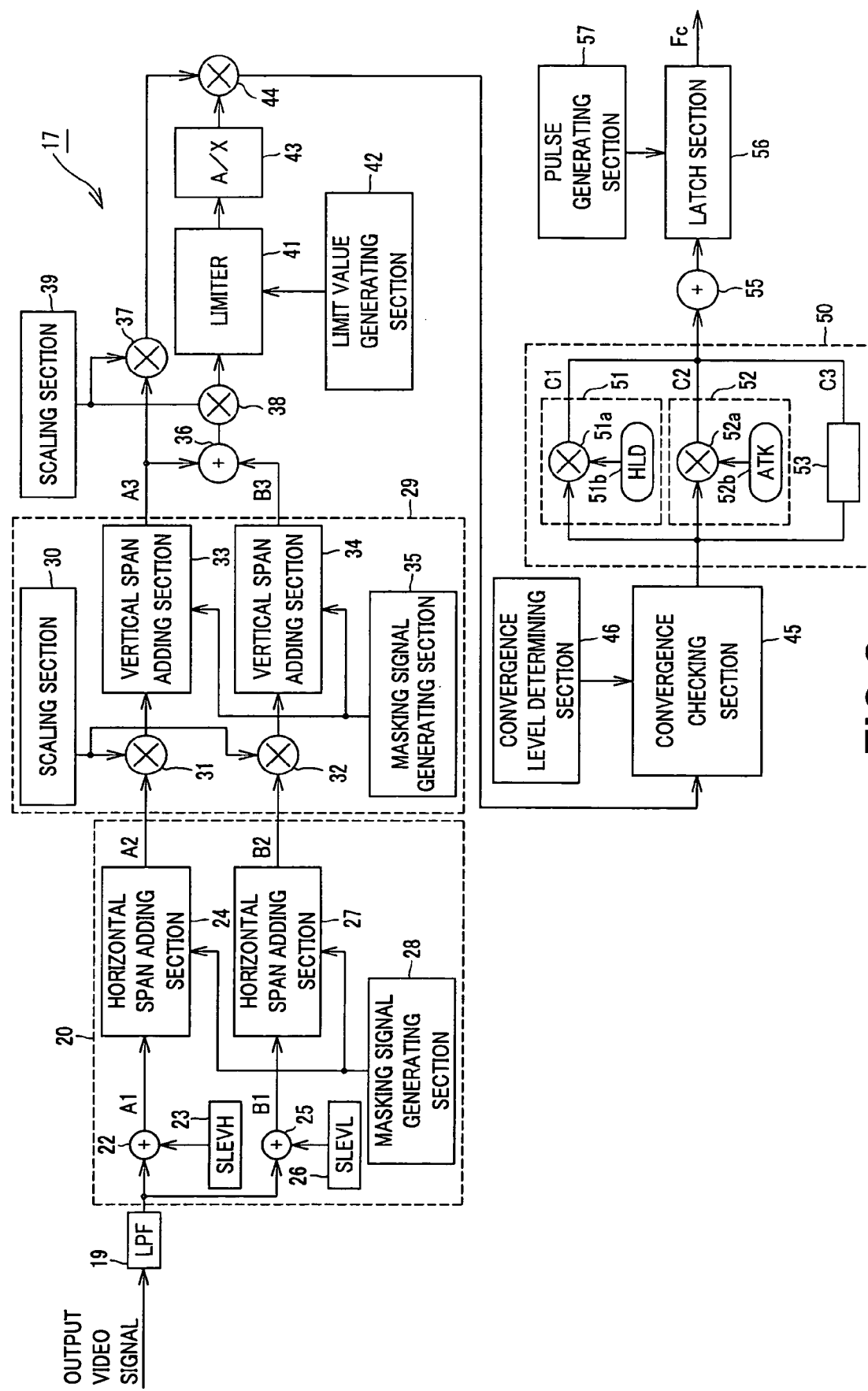
FIG. 9 is a schematic block diagram of the gain computing block.

The configuration of the gain determining block 17 will be described below by referring to FIG. 9.

The gain determining block 17 comprises an LPF 19, a horizontal span computing block 20, a vertical span adding block 29, a black area detecting section 36, a third multiplier 37, a fourth multiplier 38, a second scaling section 39, a limiter 41, a limit value generating section 42, an area scaling section 43, a fifth multiplier 44, a convergence checking section 45, a convergence level determining section 46, a processing section 50, a third adder 55, a latch section 56 and a pulse generating section 57.

The LPF 19 removes noises from the output video signal that is supplied from the quantity of black expansion adding section 16 in order to prevent the noises generated during the process of signal transmission/reception from being recognized as video signal to be subjected to black expansion and transmits the output video signal to the horizontal span computing block 20.

The horizontal span computing block 20 has a first adder 22, an SLEVH output section 23, a first horizontal span adding section 24, a second adder 25, an SLEVL output section 26, a second horizontal span adding section 27 and a first masking signal generating section 28.

The first adder 22 carriers out a subtraction on the input signal on the basis of the signal supplied from the SLEVH output section 23 and outputs the outcome of the subtraction to the first horizontal span adding section 24. The first horizontal span adding section 24 adds the input signals for a horizontal line in each and every dot clock and outputs the outcome of the addition to the vertical span adding block 29.

The second adder 25 carries out a subtraction on the input signal on the basis of the signal supplied from the SLEVL output section 26 and outputs the outcome of the subtraction to the second horizontal span adding section 27. The second horizontal span adding section 27 adds the input signals for a horizontal line in each and every dot clock and outputs the outcome of the addition to the vertical span adding block 29.

The first masking signal generating section 28 removes the synchronizing signal and other elements by transmitting a masking signal to the first horizontal span adding section 24 and the second horizontal span adding section 27.

The vertical span adding block 29 has a first scaling section 30, a first multiplier 31, a second multiplier 32, a first vertical span adding section 33, a second vertical span adding section 34 and a second masking signal generating section 35.

The first multiplier 31 and the second multiplier 32 scales the signals received from the horizontal span adding sections 24 and 27 on the basis of the scaling factor input from the first scaling section 30.

The first vertical span adding section 33 further integrates the signal received from the first multiplier 31 for a field in a vertical direction on a line by line basis. The second vertical span adding section 34 further integrates the signal received from the second multiplier 32 for a field in a vertical direction on a line by line basis.

The second masking signal generating section 35 removes the synchronizing signal and other elements by transmitting a masking signal to the first vertical span adding section 33 and the second vertical span adding section 34.

The black area detecting section 36 determines the difference between the signal input from the first vertical span adding section 33 and the signal input from the second vertical span adding section 34 and transmits it to the fourth multiplier. The third multiplier 37 scales the signal received from the first vertical span adding section 33 on the basis of the scaling factor input from the second scaling section 39 and outputs the result to the third multiplier 37. The fourth multiplier 38 scales the signal received from the black area detecting section 36 on the basis of the scaling factor input from the scaling section 39 and outputs the result to the limiter 41.

The limiter 41 imposes a limit on the signal received from the fourth multiplier 38 on the basis of the limiter signal received from the limit value generating section 42 and transmits the obtained signal to the area scaling section 43. The area scaling section 43 performs an area scaling operation, which will be described in greater detail hereinafter, on the signal input from the limiter 41 and outputs the obtained signal to the fifth multiplier 44. The fifth multiplier 44 multiplies the signals input from the third multiplier 37 and the area scaling section 43 and transmits the outcome to the convergence checking section 45.

The convergence checking section 45 compares the signal level of the signal input from the convergence level determining section 46 and the signal level of the signal received from the fifth multiplier 44 and transmits the result of comparison to the processing section 50.

The processing section 50 includes processing circuits 51 through 53 and is adapted to generate difference feedback gain that corresponds to the result of comparison received from the convergence checking section 45.

The third adding section 55 receives the difference feedback gain from the processing section 50 and also receives the feedback gain of the immediately preceding field from the latch section 56. The third adding section 55 then adds the difference feedback gain and the feedback gain of the immediately preceding field to obtain the feedback gain of the current field.

The latch section 56 stores the feedback gain of the current field generated by the third adding section 55 on the basis of the pulse transmitted from the pulse generating section 57 and supplies the feedback gain to the gain controller 15. The latch section 56 can supply feedback gains to the gain controller 15 on a field by field basis as it stores the feedback gain for each and every field.

The pulse generating section 57 oscillates to generate a pulse for the latch section 56 at predetermined timings in order to prevent the feedback gain from fluctuating in a same field.

Now, a typical operation of the gain determining block 17 will be described below.

Firstly, the LPF 19 removes noises from the output video signal output from the quantity of black expansion adding section 16. As a result, the noises generated during the process of signal transmission/reception are prevented from being recognized as video signal that needs to be subjected to an operation of black expansion. The LPF 19 then transmits the output video signal to the horizontal span computing block 20.

The first adder 22 receives an SLEVH signal suggesting that the output video signal that is subjected to an operation of black expansion is approaching the pedestal level from the SLEVH output section 23 and also receives the output video signal from the LPF 19. Assume here that the signal level of the SLEVH signal is not lower than the pedestal level and not higher than the black expansion level. The first adder 22 subtracts the luminance component of the output video signal and the SLEVH signal and generates differential added luminance level A1, which is then transmitted to the first horizontal span adding section 24.

The first horizontal span adding section 24 adds the differential added luminance levels A1 received from the first adder 22 for a horizontal line in each and every dot clock and transmits the outcome of the addition to the first multiplier 31 of the vertical span adding block 29 as horizontally added luminance level A2. In other words, the luminance component of the output video signal that is not higher than the signal level of the SLEVH signal is integrated for a horizontal line for the horizontally added luminance level A2.

The second adder 25 receives the SLEVL signal whose level is selected so as to be lower than the level of the above described SLEVH signal from the SLEVL output section 26 and also the output video signal from the LPF 19. The second adder 25 then adds the luminance component of the output video signal and the SLEVL signal to generate a differential added luminance level B1 and transmits it to the second horizontal span adding section 27.

The second horizontal span adding section 27 adds the differential added luminance levels B1 received from the second adder 25 for a horizontal line in each and every dot clock and transmits the result to the second multiplier 32 of the vertical span adding block 29 as horizontally added luminance level B2. In other words, the luminance component of the output video signal that is not higher than the signal level of the SLEVL signal is integrated for a horizontal line for the horizontally added luminance level B2.

The first masking signal generating section 28 prevents any addition from taking place in the horizontal synchronizing signal span that is intrinsically not an effective viewing range by transmitting a masking signal to the first horizontal span adding section 24 and the second horizontal span adding section 27.

The first multiplier 31 receives the horizontally added luminance level A2 obtained by the addition in the horizontal direction from the first horizontal span adding section 24 and also receives the scaling factor form the first scaling section 30. The first multiplier 31 can detect relatively same differential added luminance levels for various formats with different numbers of horizontal dots by multiplying the horizontally added luminance level A2 by the scaling factor.

Similarly, the second multiplier 32 receives the horizontally added luminance level B2 from the second horizontal span adding section 27 and also receives the scaling factor form the first scaling section 30. The second multiplier 32 performs a scaling operation by multiplying the horizontally added luminance level B2 by the scaling factor.

The first vertical span adding section 33 further integrates the horizontally added luminance level A2 received from the first multiplier 31 for a field in a vertical direction on a line by line basis. As a result, it is possible to integrate the luminance component of the output video signal that is not higher than the signal level of the SLEVH signal for a field. The luminance component integrated for a field by the first vertical span adding section 33 is referred to as field integration quantity A3 hereinafter.

The second vertical span adding section 34 further integrates the horizontally added luminance level B2 received from the second multiplier 32 for a field in a vertical direction on a line by line basis. As a result, it is possible to integrate the luminance component of the output video signal that is not higher than the signal level of the SLEVL signal for a field. The luminance component integrated for a field by the second vertical span adding section 34 is referred to as field integration quantity B3 hereinafter.

The second masking signal generating section 35 transmits a masking signal to the first vertical span adding section 33 and the second vertical span adding section 34. In this operation, any addition is prevented from taking place in the vertical synchronizing signal span that is intrinsically not an effective viewing range.

Since a higher signal level is selected for a SLEVH signal than for the SLEVL signal, the field integration quantity A3 is greater than the field integration quantity B3. The field integration quantities A3, B3 are transmitted to the black area detecting section 36. The field integration quantity A3 is also transmitted to the third multiplier 37.

Figure 10:
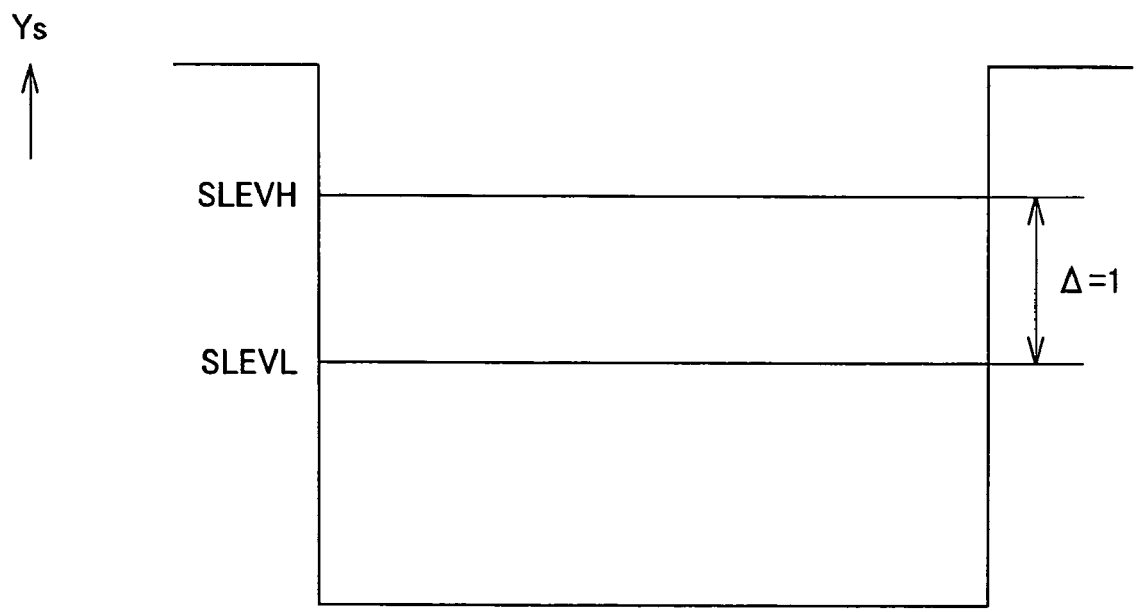
FIG. 10 is a graph schematically illustrating an operation of computing the black area.

The black area detecting section 36 receives the field integration quantity A3 and the field integration quantity B3. The black area detecting section 36 determines the area of the pixels having a luminance component that is not higher than the SLEVH signal in a field by determining the difference of the field integration quantity A3 and the field integration quantity B3. The area of the pixels having a luminance component that is not higher than the SLEVH signal is referred to as black area hereinafter. Information on the black area is referred to as black area information hereinafter. FIG. 10 is a graph schematically illustrating an operation of computing the black area. Referring to FIG. 10, the difference between the field integration quantity A3 and the field integration quantity B3 becomes equal to the area of the pixels having a luminance component that is not higher than the SLEVH signal in the field by making the difference of luminance Ys between the SLEVH signal and the SLEVL signal equal to 1.

The third multiplier 37 scales the field integration quantity A3 received from the first vertical span adding section 33, using the scaling factor input from the second scaling section 39 and outputs the obtained result to the fifth multiplier 44. The fourth multiplier 38 scales the received black area information, using the scaling factor input from the second scaling section 39 and transmits the obtained result to the limiter 41.

The limiter 41 receives the black area information from the fourth multiplier 38. The limiter 41 generates a limit value for limiting the black area contained in the black area information by means of the limit value generating section 42. The limiter 41 prevents an overflowing phenomenon from taking place in the area computing operation of the area scaling section 43, which is located downstream, by limiting the black area contained in the black area information on the basis of the limit value or transmission of black area information on black area 0 to the area scaling section 43 from taking place. The limiter 41 can prevent the area scaling section 43, which is located downstream, from scaling the slight black area that exists in the field in order to suppress degradation of the image quality by limiting the black area contained in the black area information.

The area scaling section 43 extracts the black area from the black area information input from the limiter 41 and scales it. The area scaling section 43 scales the black area on the basis of the ratio to the maximum value of the black area in the current field. In the following description, when a field is totally occupied by a black area, the area is referred to as flat field. If the extracted black area is X and the flat field is A, the area scaling section 43 computes A/X for the scaling operation. The value of A/X as computed by the area scaling section 43 indicates the ratio of the black area to the flat field.

The fifth multiplier 44 receives the field integration quantity A3 from the third multiplier 37 and the value of A/X from the area scaling section 43. The fifth multiplier 44 multiplies the field integration quantity A3 by A/X to generate modified integrated quantity A4 and transmits it to the convergence checking section 45. As a result of the multiplication by the fifth multiplier 44, using A/X, the field can be apparently treated as flat field if the black area distributed in the field can show dispersion to further improve the characteristics relative to the visual sense. The fifth multiplier 44 transmits the modified integration quantity A4 that is obtained as a result of the area scaling to the downstream convergence checking section 45. Then, the convergence checking section 45 can judge the extent of convergence by taking the ratio of the black area in the current field into consideration.

Figure 11:
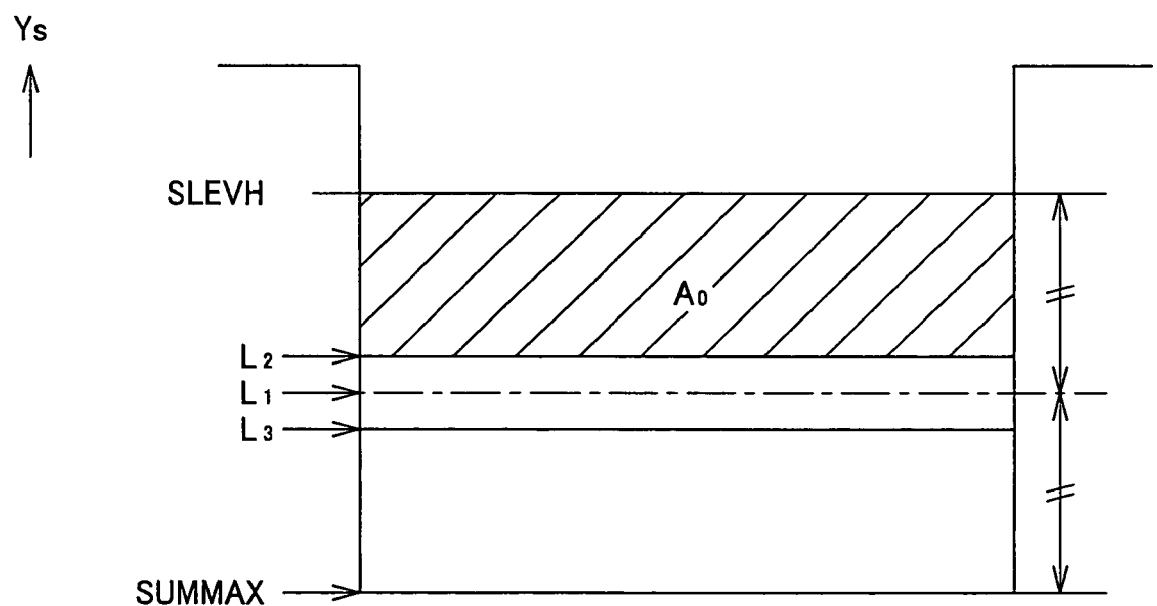
FIG. 11 is a graph schematically illustrating an operation of selecting a pedestal level.

The convergence level determining section 46 stores in advance the converged integrated quantity A0 obtained by integrating the difference between the pedestal level $L_1$ and the signal level of the SLEVH signal for a field. Note that the median value of SUMMAX and SLEVH may be selected for the pedestal level $L_1$, where SUMMAX is the detectable minimum value of modified integration quantity A4 as illustrated in FIG. 11. Also note that the convergence level determining section 46 may alternatively compute the converged integrated quantity A0 on the basis of an upper convergence level $L_2$ and a lower convergence level $L_3$ selected so as to sandwich the pedestal level $L_1$ instead of the pedestal level $L_1$ as shown in FIG. 11.

Figure 12:
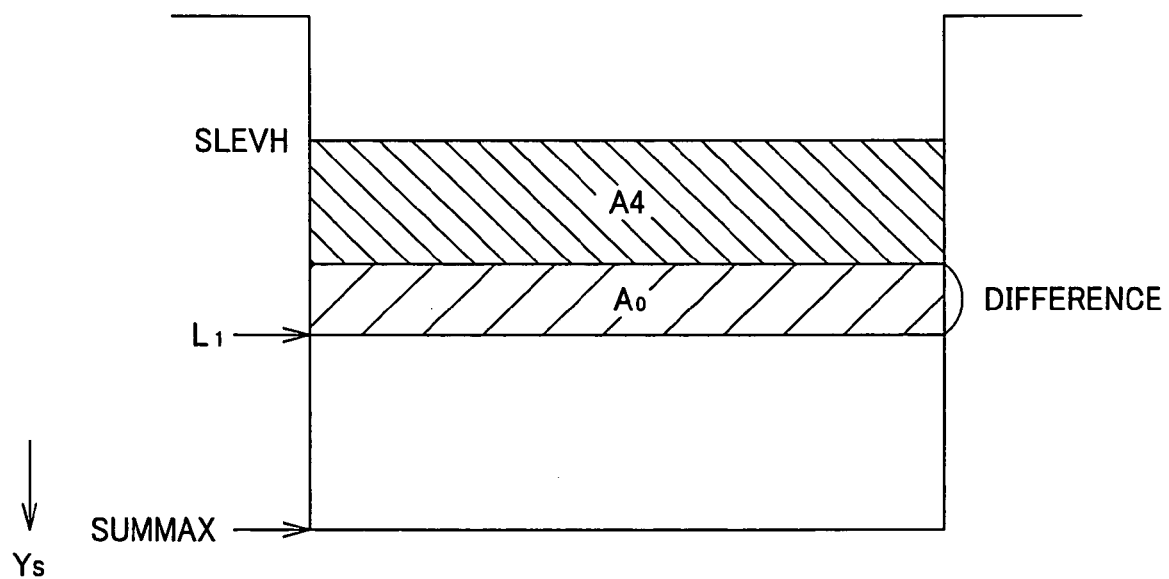
FIG. 12 is a graph schematically illustrating an operation of comparing the modified integrated quantity of the convergence check section.

The convergence checking section 45 receives the modified integrated quantity A4 from the fifth multiplier 44 and the converged integrated quantity A0 from the convergence level determining section 46. The convergence checking section 45 compares the modified integrated quantity A4 and the converged integrated quantity A0 typically by determining the difference between them as shown in FIG. 12 and transmits the result of comparison to the processing section 50.

The processing section 50 includes processing circuits 51 through 53 and is adapted to generate differential feedback gains C1, C2, C3 as a function of the result of comparison received from the convergence checking section 45.

If the modified integrated quantity A4 is smaller than the converged integrated quantity A0, the processing section 50 generates differential feedback gain C1 that is used to raise the feedback gain Fc by way of the processing circuit 51. The processing circuit 51 computes |modified integrated quantity A4—converged integrated quantity A0| and multiplies it by the positive polarity transmitted from HLD transmitting section 51b in the multiplication circuit 51a to generate differential feedback gain C1 so as to raise the feedback gain it generates to a large extent when the difference between the modified integrated quantity A4 and the convergence level is large.

When the modified integrated quantity A4 is larger than the converged integrated quantity A0, the processing section 50 generates differential feedback gain C2 in order to lower the feedback gain by way of the processing circuit 52. The processing circuit 52 computes |modified integrated quantity A4—converged integrated quantity A0| and multiplies it by the negative polarity transmitted from ATK transmitting section 52b in the multiplication circuit 52a to generate differential feedback gain C2 so as to raise the feedback gain it generates to a large extent when the difference between the modified integrated quantity A4 and the convergence level is large.

If the received result of comparison tells that the modified integrated quantity A4 is equal to the converged integrated quantity A0, the processing section 50 judges that the quantity of black expansion is appropriate and the processing circuit 53 generates differential feedback gain C3 that is equal to "0" so as not to shift the feedback gain.

If the convergence level determining section 46 is adapted to compute the converged integrated quantity A0 on the basis of an upper convergence level $L_2$ and a lower convergence level $L_3$ instead of the pedestal level $L_1$, the processing section 50 generates differential feedback gain C3 when the modified integrated quantity A4 is found between the two converged integrated quantities A0. With this arrangement, ON and OFF are not repeated more frequently for black expansion to prevent images of black level from fluctuating and visual problems from arising if compared with the arrangement where the converged integrated quantity is computed on the basis of the pedestal level.

The processing section 50 transmits the differential feedback gains C1, C2, C3 it generates to the third adding section 55.

The third adding section 55 receives the differential feedback gains C1, C2, C3 from the processing section 50 and the feedback gain Fc of the immediately preceding field from the latch section 56. The third adding section 55 then adds the differential feedback gains and the feedback gain FC of the immediately preceding field to use the sum as the feedback gain Fc of the current field. As a result of generating such a feedback gain Fc, black expansion is promoted when the modified integrated quantity A4 is smaller than the converged integrated quantity A0, whereas it is suspended when the modified integrated quantity A4 exceeds the converged integrated quantity A0.

As a result of storing the feedback gain of the current field by way of the latch section 56, it is possible to prevent the feedback gain to be supplied to the gain controller 15 from fluctuating in a same field so that the feedback gain would no longer be shifted while an image is being displayed on the television receiving set. Thus, the phenomenon of pseudo-profile and that of shading can be prevented from appearing if compared with conventional video signal-processing devices adapted to hold the black peak.

As described above, the feedback gain that is transmitted to the gain controller 15 from the gain determining block 17 is generated by integrating the luminance component of the output video signal that is not higher than the signal level of the SLEVH signal for a field and comparing the result of the integration with the converged integrated quantity obtained by integrating the difference between the pedestal level and the signal level of the SLEVH signal for a field. With this arrangement, it is possible to converge each detected black level to an optimum luminance level on a field by field basis so that a video signal-processing device according to the invention can respond quickly even when a video signal for quickly changing scenes is input and improve the apparent contrast of the luminance component. Additionally, since the feedback gain can be generated by taking the ratio of the black area into consideration, it is possible to improve the apparent contrast of the luminance component for any input video signals with different black areas.

According to the present invention, when the luminance component of the output video signal falls below SLEVH as shown in FIG. 8B, it is possible to add a regulated quantity of black expansion on the basis of the feedback gain and hence it is possible to gradually bring the luminance component close to the pedestal level on a field by field basis. Therefore, according to the invention, the quantity of black expansion can be reduced when the luminance component of the output video signal that is subjected to black expansion falls below SLEVH, whereas the quantity of black expansion can be increased when the luminance component of the output video signal that is subjected to black expansion rises above SLEVH. Therefore, it is possible to improve the apparent contrast of the luminance component so as to be free from lack of gradation for black.

Additionally, according to the invention, since the internal resistances of the ICs and the capacitances of capacitors are free from variances unlike known video processing devices, it is possible to accurately compute the black area and the modified integrated quantity A4. As a result, black expansions can be realized highly accurately to eliminate comparison motions due to undulations that are observed with the peak holding system and hence it is possible to stabilize the black level because the black level is processed for black expansion in order to hold the feedback gain to a constant level in each field.

The present invention is by no means limited to the above embodiments that are described by referring to the accompanying drawings, which embodiments may be modified and altered in various different ways without departing from the scope of the invention as may be apparent to those who are skilled in the art.

INDUSTRIAL APPLICABILITY

As has been described above, according to the present invention, the device and the method for processing video signals regulates the computed quantity of black expansion on the basis of the luminance component of the output video signal that is not higher than the signal level of the SLEVH signal integrated for a field, when the luminance component of the input video signal is not higher than the black expansion level. Since the feedback gain can be generated by taking the ratio of the black area into consideration, it is possible to improve the apparent contrast of the luminance component in the television receiving set for any input video signals with difference black areas.

The invention claimed is:

1. A video signal-processing device comprising:
   quantity of black expansion computing means for computationally determining a quantity of black expansion when a luminance component of an input video signal is not higher than a first luminance level;
   regulating means for regulating the quantity of black expansion computationally determined by the quantity of black expansion computing means;
   output video signal generating means for generating an output video signal by adding the quantity of black expansion regulated by the regulating means to the luminance component of the input video signal; and
   field integrating means for integrating the luminance component of the output video signal not higher than a second luminance level for a field of the input video signal, wherein
   the regulating means is adapted to regulate the quantity of black expansion according to the luminance component integrated by the field integrating means.

2. The device according to claim 1, wherein the quantity of black expansion computing means computes the quantity of black expansion according to a difference between the luminance component of the input video signal and the first luminance level.

3. The device according to claim 1, further comprising:
   comparing means for comparing the luminance component as integrated by the field integrating means with a predefined convergence level, wherein
   the regulating means is adapted to regulate the quantity of black expansion according to a result of comparison of the comparing means.

4. The device according to claim 3, wherein the regulating means is adapted to increase the quantity of black expansion when the integrated luminance component is smaller than the predefined convergence level, to limit the quantity of black expansion when the integrated luminance component is larger than the convergence level, and to make the quantity of black expansion equal to 0 when the integrated luminance component is equal to the predefined convergence level.

5. The device according to claim 3, wherein the regulating means regulates the quantity of black expansion based on a difference between the integrated luminance component and the predefined convergence level.

6. The device according to claim 3, wherein the comparing means makes the quantity of black expansion equal to 0 when the integrated luminance component is close to the predefined convergence level.

7. The device according to claim 3, further comprising:
gain output means for outputting a feedback gain according to the result of the comparison of the comparing means, wherein
the regulating means is adapted to regulate the quantity of black expansion by multiplying the quantity of black expansion by the feedback gain output from the gain output means.

8. The device according to claim 1, further comprising:
black area computing means for computing a black area where the luminance component is not higher than the second luminance level in the field of the output video signal, wherein
the regulating means is adapted to regulate the quantity of black expansion based on the luminance component integrated by the field integrating means and the black area determined by the black area computing means.

9. The device according to claim 8, wherein the field integrating means comprises first field integrating means and further comprising:
second field integrating means for integrating the luminance component of the output video signal not higher than a third luminance level for a field of the input video signal, wherein
the black area computing means is adapted to determine the black area according to a difference between the output of the first field integrating means and the output of the second field integrating means.

10. The device according to claim 1, wherein the regulating means is adapted to regulate the quantity of black expansion on a field by field basis.

11. A video signal-processing method comprising the steps of:
computationally determining a quantity of black expansion when a luminance component of an input video signal is not higher than a first luminance level;
regulating the computationally determined quantity of black expansion;
generating an output video signal by adding the regulated quantity of black expansion to the luminance component of the input video signal;
integrating the luminance component of the output video signal not higher than a second luminance level for a field of the input video signal; and
further regulating the quantity of black expansion according to the integrated luminance component.

12. The method according to claim 11, wherein the quantity of black expansion is computed according to a difference between the luminance component of the input video signal and the first luminance level.

13. The method according to claim 11, further comprising the step of:
comparing the integrated luminance component with a predefined convergence level so as to regulate the quantity of black expansion according to a result of comparison of the step of comparing.

14. The method according to claim 13, further comprising the steps of:
increasing the quantity of black expansion when the integrated luminance component is smaller than the convergence level; and
limiting the quantity of black expansion when the integrated luminance component is larger than the convergence level, wherein the quantity of black expansion is made equal to 0 when the integrated luminance component is equal to the convergence level.

15. method according to claim 13, further comprising the step of regulating the quantity of black expansion based on a difference between the integrated luminance component and the convergence level.

16. The method according to claim 13, further comprising the step of regulating the quantity of black expansion to be equal to 0 when the integrated luminance component is close to the convergence level.

17. The method according to claim 13, further comprising the step of:
generating a feedback gain according to the result of the comparison in the comparing step, wherein
the quantity of black expansion is regulated by multiplying the quantity of black expansion by the generated feedback gain.

18. The method according to claim 11, further comprising the step of:
computing a black area where the luminance component is not higher than the second luminance level in the field of the output video signal, wherein
the quantity of black expansion is regulated based on the integrated luminance component and the determined black area.

19. The method according to claim 18, further comprising the step of:
integrating the luminance component of the output video signal not higher than a third luminance level for a field, wherein
the black area is determined based on a difference between the integrated luminance component and the luminance component obtained by integrating the output video signal not higher than the second luminance level for a field.

20. The method according to claim 11, wherein the quantity of black expansion is regulated on a field by field basis.

* * * * *